Patented June 24, 1930

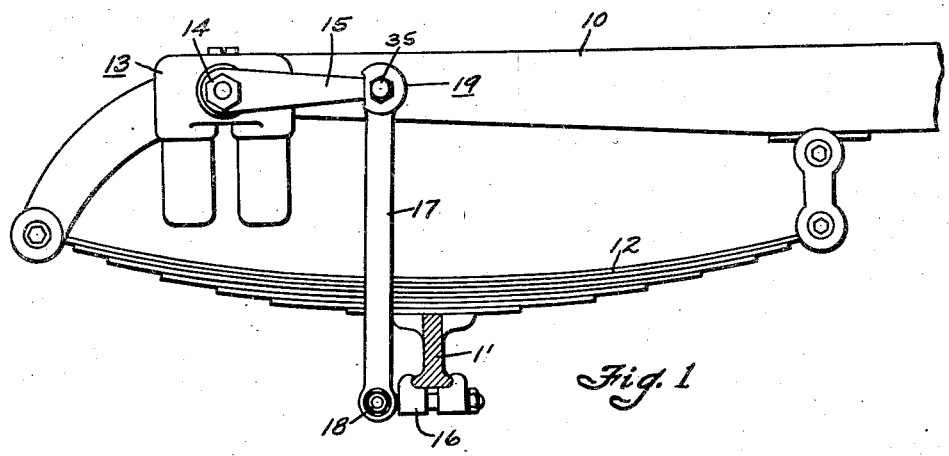
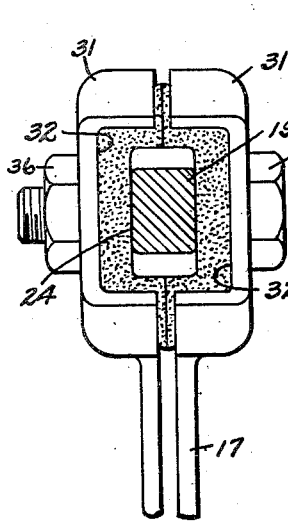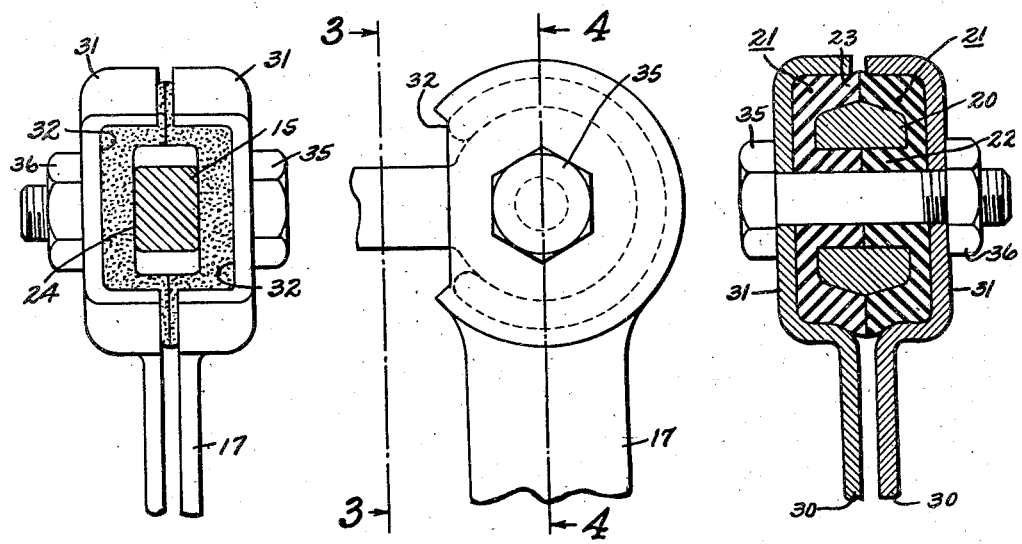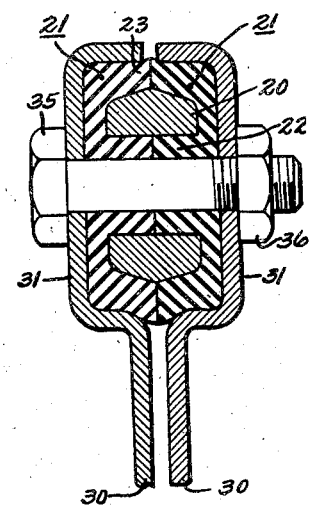

1,766,882

UNITED STATES PATENT OFFICE

WILLIAM A. CHRYST, OF DAYTON, OHIO, ASSIGNOR TO DELCO PRODUCTS CORPORATION, OF DAYTON, OHIO, A CORPORATION OF DELAWARE

PIVOT JOINT

Application filed February 21, 1929. Serial No. 341,809.

This invention relates to isolating non-metallic pivot or universal joints connecting two relatively movable parts.

An object of the invention is to provide a simple but efficient form of joint containing resilient, non-metallic material, such as soft rubber, which provides for some or all of the relative movement between the parts by distortion within the non-metallic material whereby looseness, rattle, wear and necessity for lubrication is avoided.

Further objects and advantages of the present invention will be apparent from the following description, reference being had to the accompanying drawings, wherein a preferred embodiment of one form of the present invention is clearly shown.

In the drawings:

Fig. 1 is a somewhat diagrammatic view showing parts of the front end of an automobile chassis equipped with a hydraulic shock absorber, and also showing the thrust link connected to the shock absorber lever arm by the pivot joint of this invention.

Fig. 2 is a side elevation on a larger scale of the pivot joint of this invention.

Fig. 3 is a view taken on line 3—3 of Fig. 2.

Fig. 4 is a section taken on line 4—4 of Fig. 2.

Similar reference characters refer to similar parts throughout the several drawings.

In Fig. 1, 10 designates the front end of the chassis frame side rail, 11 the front axle, 12 the leaf spring connecting frame and axle, and 13 a double-acting hydraulic shock absorber unit which is rigid with side rail 10. Unit 13 has a laterally projecting rock shaft 14 having a lever arm 15 fixed thereto. The outer end of lever 15 is connected to the upper end of thrust link 17 by means of the pivot joint 19, and the lower end of link 17 is connected by the joint 18 to the fitting 16 which is rigidly fixed to axle 11. Therefore link 17 is under compression when axle 11 is moving up and thereby causing lever 15 to swing counter-clockwise and conversely is under tension when axle 11 is moving down. The general arrangement of the parts so far described forms no part of the present invention, this invention relating to the improved form of joint 19.

The outer end of arm 15 has an eye 20 preferably integral therewith, as shown. Two molded soft rubber blocks 21 are inserted over eye 20 until they abut along the center line thereof and thus form an internal bushing 22 and an external bushing 23 for said eye 20, the external bushing 23, however, being provided with a suitable aperture 24 through which lever arm 15 extends. (See Fig. 3.) The thrust link 17 is illustrated as being made from two cooperating pressed metal halves 30 which, when bolted together as shown, will form a quite rigid link. Each half 30 terminates at its upper end in a cup portion 31 which fits snugly around the outside of the rubber blocks 21, each cup 31 being provided with a cut-out portion or opening 32 to provide ample clearance with lever 15 where it emerges from the rubber. (See Fig. 3.) The bolt 35 passes through central apertures in cups 31 and through the interior rubber bushing 22. By tightening nut 36 as desired, it is obvious that the soft rubber material may be put under any desired initial compression, such as to give the desired non-slipping bond between the rubber and its contacting metal parts during relative movement between lever 15 and link 17. Figs. 3 and 4 show the two cups 31 separated a short distance, thus providing a small annular space for the rubber to flow when compressed. When very high compression is desired the cups 31 may be made to contact when nut 36 is drawn up to its tightest position, the rubber being permitted to bulge outwardly only through the recesses 32 surrounding arm 15.

The side sway or lateral movement between side rail 10 and axle 11 will impose a certain amount of lateral pivoting or universal movement between lever 15 and link 17. Such lateral pivoting can be taken by the joint 19, as can be readily seen from Fig. 4 by considering eye 20 held stationary and the lower end of link 17 moved to the right or left. It is obvious that there will be no metal-to-metal contact until the link 17 is moved through quite a large angle, the soft rubber material of course distorting or flowing around within its confining casing to permit this lateral distortion. The joint 18 at the lower end of link 17 may be a substantial duplicate of the upper joint 19, or it may be any other suitable type of joint which will permit a slight universal movement of link 17 relative to fitting 16.

The joint of this invention may be used in any case where there is a limited angular movement between the connected parts. The limiting pivot angle in the joint illustrated being determined by the lever 15 where it emerges from the rubber contacting with the cups 31 at the openings 32 therein.

While the form of embodiment of the present invention as herein disclosed, constitutes a preferred form, it is to be understood that other forms might be adopted, all coming within the scope of the claims which follow.

What is claimed is as follows:

1. A pivot joint connecting two relatively movable parts comprising: an eye member fixed on one of said parts, a resilient non-metallic member surrounding said eye member and extending interiorly thereof, an exterior metal casing clamped upon said resilient member and fixed to the second relatively movable part, and a pin extending transversely through said casing and eye member but isolated from said eye member by said resilient material.

2. A pivot joint connecting two relatively movable parts comprising: an eye member fixed on one of said parts, a resilient non-metallic member surrounding said eye member, an exterior metal casing surrounding and clamped upon said resilient member and fixed to the second relatively movable part, and a bolt extending through said casing and eye member for clamping said casing upon said resilient member.

3. A pivot joint connecting two relatively movable parts comprising: an eye member fixed on one of said parts, a resilient non-metallic member surrounding said eye member and extending interiorly thereof, two metal cupped members clamped upon opposite sides of and encasing said resilient member and fixed to the second relatively movable part, and a pin extending through said eye member and isolated therefrom and supported by said cupped members.

4. A pivot joint connecting two relatively movable parts comprising: an eye member fixed on one of said parts, a resilient non-metallic member surrounding said eye member, two metal cupped members clamped upon opposite sides of and encasing said resilient member and fixed to the second relatively movable part, and a pin extending through said eye member and cupped members and holding said cupped members clamped in place.

5. A pivot joint connecting two relatively movable parts comprising: an eye member fixed on one of said parts, a resilient non-metallic member surrounding said eye member, said second movable part comprising two metal bars each terminating in a pressed metal cup, said bars being fixed together so that said cups are clamped upon opposite sides of said resilient member, and a transverse pin extending through said eye member and supported by said cup members.

In testimony whereof I hereto affix my signature.

WILLIAM A. CHRYST.